United States Patent
Onishi et al.

(10) Patent No.: US 7,062,941 B2
(45) Date of Patent: Jun. 20, 2006

(54) MANUFACTURING METHOD OF OPTICAL FIBER PREFORM

(75) Inventors: Masashi Onishi, Yokohama (JP); Eiji Yanada, Yokohama (JP); Masaaki Hirano, Yokohama (JP); Hideyuki Ijiri, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 446 days.

(21) Appl. No.: 10/103,786

(22) Filed: Mar. 25, 2002

(65) Prior Publication Data

US 2002/0174689 A1 Nov. 28, 2002

(30) Foreign Application Priority Data

Mar. 29, 2001 (JP) ............................ 2001-096226

(51) Int. Cl.
*C03B 37/07* (2006.01)
(52) U.S. Cl. .............. 65/378; 65/382; 65/31; 65/61; 451/5; 451/6; 451/41
(58) Field of Classification Search ............ 65/378, 65/382, 61, 31; 451/5, 6, 41
See application file for complete search history.

(56) References Cited

U.S. PATENT DOCUMENTS

| | | | | |
|---|---|---|---|---|
| 3,971,645 A | * | 7/1976 | Bachmann et al. ........... | 65/419 |
| 4,049,413 A | * | 9/1977 | French ........................ | 65/392 |
| 6,131,414 A | * | 10/2000 | Shimizu et al. ............... | 65/378 |
| 6,467,310 B1 | * | 10/2002 | Terashima et al. ............ | 65/382 |
| 6,565,417 B1 | * | 5/2003 | Kase et al. .................... | 451/6 |

FOREIGN PATENT DOCUMENTS

| | | |
|---|---|---|
| JP | 8-217461 | 8/1896 |
| JP | 5-286735 | 11/1993 |
| JP | 9-328328 | 12/1997 |
| JP | 2000-47039 | 2/2000 |

OTHER PUBLICATIONS

Machine translation of JP 09328328 A on Aug. 25, 2004.*

* cited by examiner

*Primary Examiner*—Sean Vincent
(74) *Attorney, Agent, or Firm*—McDermott Will & Emery LLP

(57) ABSTRACT

A method for manufacturing an optical fiber preform that can produce an optical fiber having desired characteristics over the longer length thereof. A crude preform provided with a core region and a cladding region is prepared (Step S1), and at a plurality of positions in the longitudinal direction of the crude preform, a refractive index profile in the cross-section of the crude preform is measured (Step S2). Then, the shape of the cladding region is demarcated based on the shape of the profile (Step S3). Subsequently, the crude preform is ground based on the results of the demarcation (Step S4). Thus, an optical fiber preform that enables the manufacture of an optical fiber having target characteristics is manufactured.

5 Claims, 6 Drawing Sheets

MANUFACTURING METHOD OF OPTICAL FIBER PREFORM

BACKGROUND OF THE INVENTION

1. Field of the Invention

The present invention relates to a method for manufacturing an optical fiber having desired characteristics over the longer length thereof.

2. Description of the Background Art

For manufacturing an optical fiber preform, there are several methods, such as the Outside Vapor Deposition (OVD) method, the Modified Chemical Vapor Deposition (MCVD) method, the Vapor phase Axial Deposition (VAD) method, and the Rod-in-collapse method. These typical methods for manufacturing an optical fiber preform have been used widely. However, since the allowable scope of the profile shape parameter, compared to that in a ordinary single mode fiber, is limited in a dispersion shifted fiber, a dispersion flatted fiber, and a dispersion compensating fiber, etc., these optical fibers produced by drawing the optical fiber preform made simply by the above-mentioned manufacturing methods have occasionally failed to achieve a target value for their characteristics, such as the chromatic dispersion, the dispersion slope, the polarization dependent loss, and the effective core area.

Therefore, there have been attempts to machine an optical fiber preform so that an optical fiber having the desired characteristics can be produced therefrom. Japanese Patent Application Publication No. 2000-47039 discloses a method in which the core eccentricity of an optical fiber preform and the ovality of the cladding region thereof are decreased by machining the optical fiber preform in the state where the center axis of the core region of the optical fiber preform is set to the center axis of rotation of a cylindrical grinding machine. Also, Japanese Patent Application Publication No. 9-328328 discloses a method in which the unevenness of the surface of an optical fiber preform is decreased by cylindrical grinding performed in the state where the center axis of the core region of the optical fiber preform is set to the axis of rotation of a cylindrical grinding apparatus.

However, the drawback of the conventional methods for manufacturing an optical fiber is that the profile shape parameter changes in the longitudinal direction of the preform according to a slight fluctuation in the manufacturing conditions. That is, as for the above-mentioned kinds of fibers in particular, it was difficult to achieve the desired characteristics uniformly over the entire length of the preform even if a desired profile shape parameter is obtained at one position of the optical fiber preform.

SUMMARY OF THE INVENTION

An object of the present invention is to provide a method for manufacturing an optical fiber preform that can produce an optical fiber having desired characteristics over the longer length thereof.

In order to achieve this object, a method for making an optical fiber preform is provided which comprises (a) a first process of preparing a crude preform to manufacture an optical fiber preform, (b) a second process of measuring the refractive indexes along a straight line in the cross-section which is perpendicular to the axis of the crude preform at a plurality of positions in the longitudinal direction of the crude preform, (c) a third process of demarcating the outer diameter shape of the crude preform based on the results of the second process so that the optical fiber preform can produce an optical fiber having the target characteristics, and (d) a fourth process of grinding the crude preform based on the results of the third process, these processes being carried out in the order of enumeration.

In one embodiment, the demarcation of the outer diameter shape of the crude preform may be performed in the third process based on the fitting obtained using the results of the second process and a given function. After the fourth process, the outer peripheral part of the crude preform may be subjected to etching in a solution that includes at least hydrofluoric acid. Also, after the fourth process, a cladding region may be formed further around the outer peripheral part of the crude preform, and the crude preform may again be subjected to the second through fourth processes in the enumerated order to produce a desired optical fiber preform.

The crude preform is a glass rod having at least a part that becomes a core, and it may not have a part that becomes a cladding. Also, the optical fiber preform means a preform from which an optical fiber is produced by drawing.

The present invention is further explained below with reference to the accompanying drawings. The drawings are provided solely for the purpose of illustration and are not intended to limit the scope of the invention.

DESCRIPTION OF THE PREFERRED EMBODIMENTS

Figure 1:
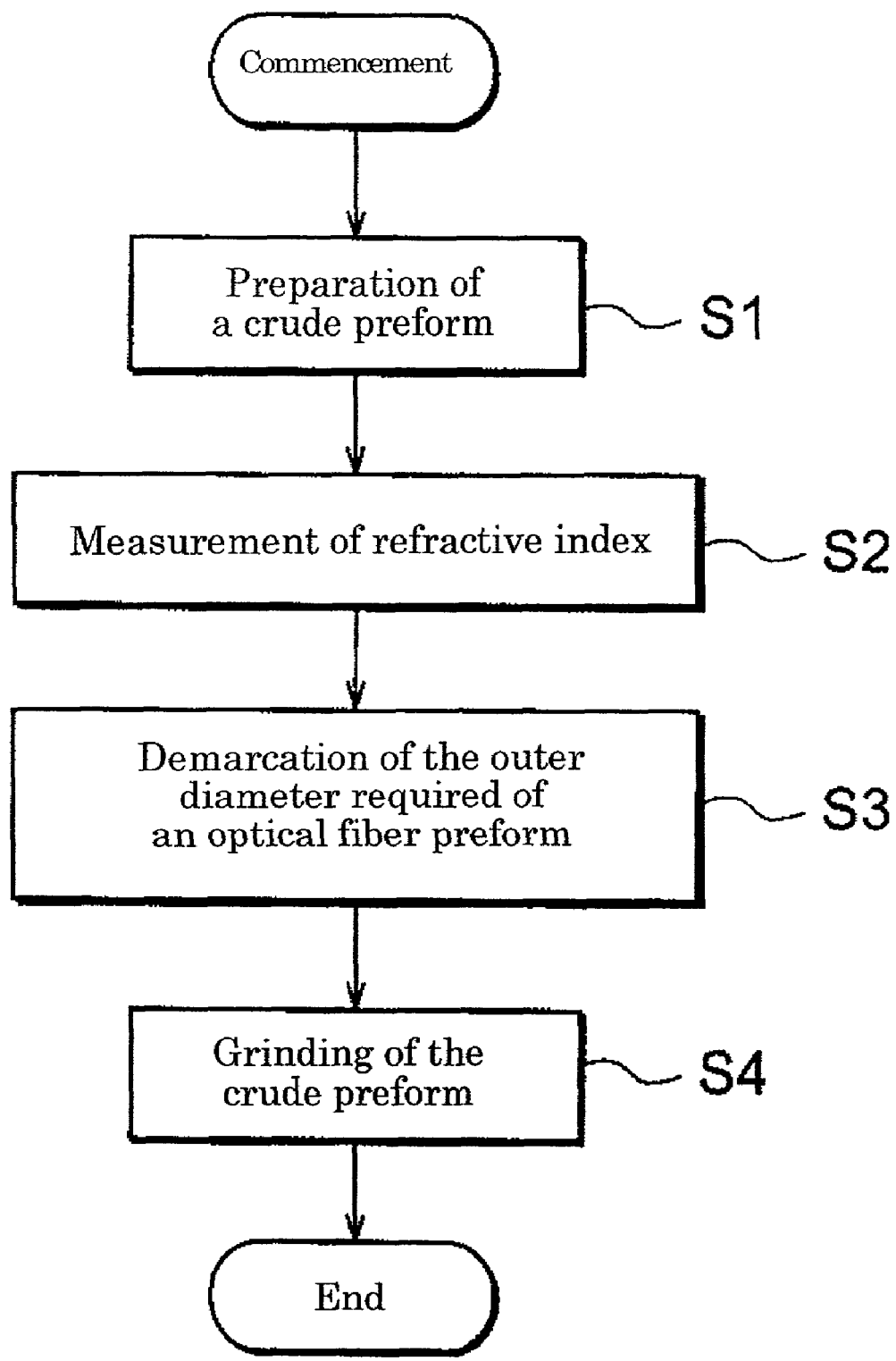
FIG. 1 is a flow chart showing the first embodiment of the present invention.

Embodiments of the present invention are explained below by referring to the accompanying drawings. In the drawings, the same number bears the same sign to avoid duplicate explanation. The ratios of the dimensions in the drawings do not necessarily coincide with the explanation.

First Embodiment

FIG. 1 is a flow chart illustrating the first embodiment of the present invention. First, a crude preform is prepared (Step S1). The crude preform is prepared by inserting a glass rod of high circularity into a glass pipe, and collapsing the same. The glass rod consists of silica glass doped with $GeO_2$ and becomes a core region. The glass pipe is made of pure silica glass and becomes a cladding region. The crude preform may be prepared by the OVD method or the MCVD method. Since the outer peripheral part of the crude preform is ground as described later, the cladding region has a sufficient margin for grinding.

Next, at a plurality of positions in the longitudinal direction of the crude preform, the refractive indexes are measured along a straight line in the cross-section perpendicular to the axis of the crude preform (hereinafter, called the "cross-section of the crude preform"). The positions are chosen such that the interval between two adjacent positions becomes equal to or more than 1 km when the crude preform is drawn into an optical fiber later. A non-destructive refractive index profile measurement equipment (preform analyzer) is used for such measurement. (Step S2)

Subsequently, the estimated characteristics (e.g., chromatic dispersion characteristics) of an optical fiber to be produced from the preform are determined based on the measured refractive indexes by the finite element method or the like. When the estimated characteristics are different from the target characteristics, the outer diameters of the core region and the cladding region which the optical fiber preform should have at each position to eliminate such differences are demarcated. For such demarcation a computer having suitable software for such processing can be used. Thus, the shape of the cladding region of the crude preform is demarcated to the outer diameter shape which the optical fiber preform should have (Step S3), and the part to be ground and the grind quantity are calculated.

After the procedures described above, the crude preform is set to a numerically controlled lathe. The results of the above-mentioned calculation are input to the control unit of the lathe through an input device after they have been processed according to the data form of the input device of the lathe. The number of the data to be input at this time is, for example, one position per unit length of 1 km or more as converted into the length of a resultant optical fiber, as described above.

Also, more preferably the lathe has a feature by which the shapes of a cladding region can be determined at a plurality of intermediate positions by fitting with a given function, e.g., a straight line or other smooth function based on the shapes of the cladding region demarcated at a plurality of positions. Using such means enables the calculation of the shapes which the cladding region should have in the intermediate parts among the measured positions, and based on this the grind quantity can be adjusted more suitably. Also, the number of the positions to be measured positions, and based on this the grind quantity can be adjusted more suitably. Also, the number of the positions to be measured can be reduced, and hence the time needed for the manufacture can also be decreased. The demarcation of the shapes of the cladding region in the intermediate parts among a plurality of positions may be preformed with the computer Step S3.

After inputting the data, the outer peripheral part of the crude preform is ground by the numerically controlled lathe. In the case of such grinding, the movement of a grinding blade and the number of rotations of the crude preform and so on are controlled based on the input data by the control unit of the numerically controlled lathe, and consequently only the part that should be ground is ground (Step S4).

Preferably, a processing by etching is performed after grinding. In the case of grinding by a numerically controlled lathe, comparatively significant unevenness occurs on the ground surface. Such unevenness tends to cause a resultant optical fiber to fail to meet the target characteristics. Also, when the obtained optical fiber preform is drawn into an optical fiber, there is a fear of the optical fiber being broken. Moreover, since moisture tends to adsorb to the uneven surface, there is a possibility of the moisture being absorbed into the optical fiber, thereby causing deviation from the pre-determined optical characteristics thereof. Furthermore, it is feared that a small amount of metal powder generated from the grinding blade of the lathe as a result of grinding may remain in the uneven part, thereby having an adverse effect on the characteristics of the optical fiber. Therefore, the ground crude preform is immersed in a solution including hydrogen fluoride (HF) by 10%, for example, for a given time such that the outermost surface of the outer peripheral part is subjected to etching and the unevenness due to grinding is smoothed.

In the manner as described above, an optical fiber preform which enables the manufacture of an optical fiber having the target characteristics is produced, and an optical fiber having the desired characteristics can be manufactured by drawing the optical fiber preform.

Second Embodiment

Next, the second embodiment of the present invention is explained.

Figure 2:
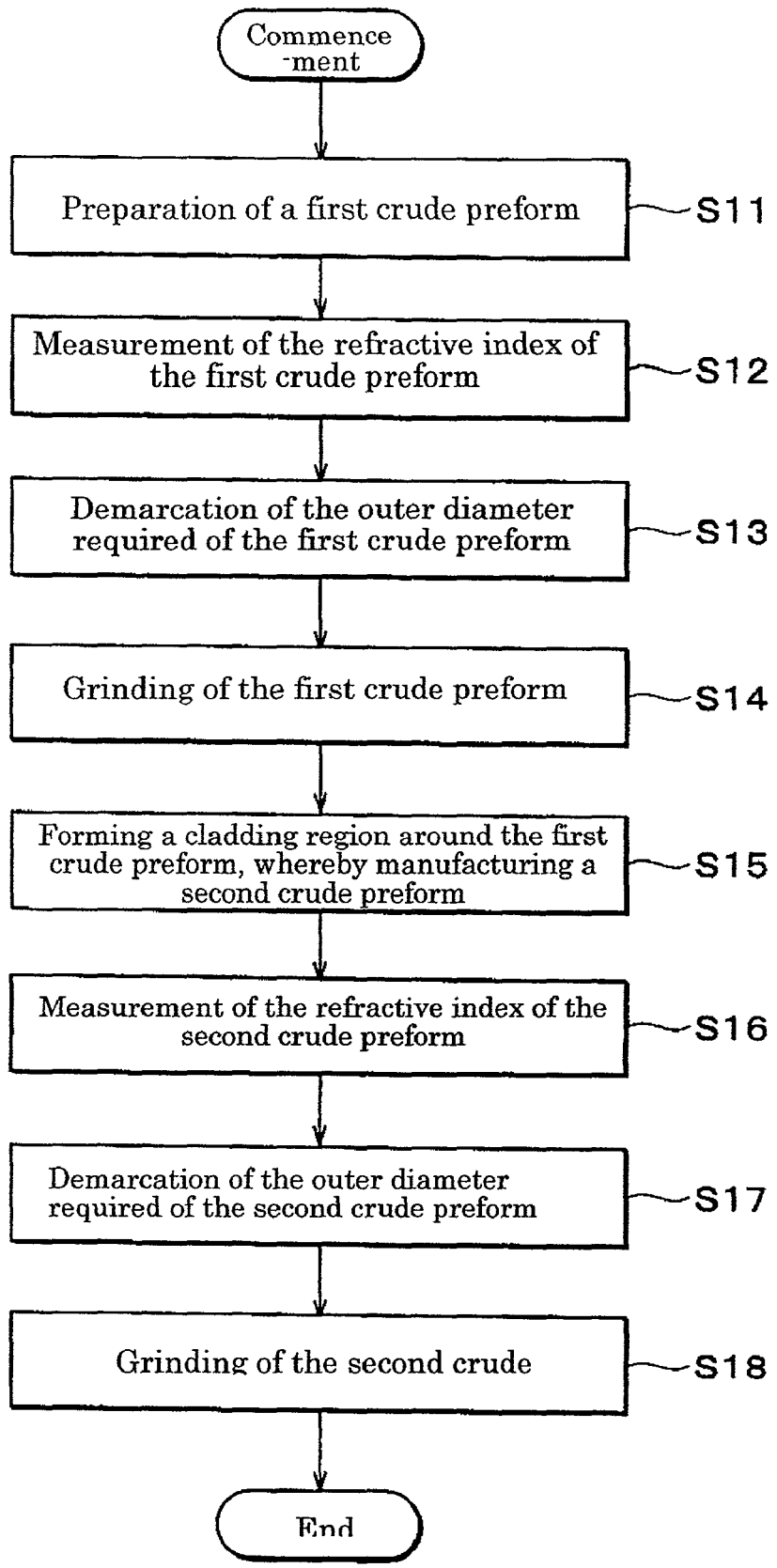
FIG. 2 is a flow chart showing the second embodiment of the present invention.

FIG. 2 is a flow chart illustrating the manufacturing method of the optical fiber preform according to the embodiment. Steps S11 through S14 are basically identical to Steps S1 through S4 of the first embodiment. However, in the second embodiment, a prepared crude preform (the first crude preform) may have only a core region. Also, The number of the positions measured is equivalent to one per length of about 1 km for a resultant optical fiber.

Subsequently, the second crude preform is produced by forming a cladding region around the first crude preform that has been ground in Step S14 (Step S15). The methods suitable for forming the cladding region are the VAD method, the OVD method and the Rod-in-collapse method, etc.

Furthermore, the second crude preform is subjected to Steps S16 through S18. Except that the crude preform to be treated is the second crude preform, Step S16 is identical to Step S2, and Step S17 is identical to Step S3, and Step S18 is identical to Step S4.

It is preferable that the etching is also performed after Step S14 and Step S18 in the second embodiment. Without etching treatment, particularly in the case of the first crude preform having only a core region, there is a concern that the unevenness of the ground surface has a significant influence on the characteristics of the optical fiber, since the ground surface in Step S14 becomes a boundary between the core region and the cladding region. By drawing an optical fiber preform manufactured as described above, an optical fiber having the desired characteristics is produced.

According to the second embodiment of the present invention, first, the refractive indexes in the cross-section of the crude preform are measured at a plurality of positions along the first crude preform. Next, the outer diameter shape of the first crude preform is demarcated based on the refractive index profiles, and the first crude preform is ground based on the result. After that, a second crude preform is prepared by forming a cladding region around the outer peripheral surface of the ground first crude preform. The measurement of the refractive indexes is implemented again with respect to the second crude preform, and based on the refractive index profiles the shape of the outer diameter that the optical fiber preform should have is demarcated. The second crude preform is ground based on the result of such demarcation to produce an optical fiber preform.

By appropriately adjusting the refractive index of the core region (or, the core region and cladding region) of the first crude preform and the refractive index of the cladding region of the second crude preform, it is possible to manufacture an optical fiber preform that can produce an optical fiber having the target characteristics over its whole length even in the case of an optical fiber having a complicated refractive index profile shape and a narrow scope of profile shape parameter, such as a dispersion shifted fiber, a dispersion flatted fiber or a dispersion compensating fiber, etc.

A crude preform ground in Step S18 may be subjected to Step S15 and thereafter to Steps S16 through S18, once or several times repeatedly. Such manufacturing method is particularly preferable for producing an optical fiber preform suitable for manufacturing an optical fiber having a complicated refractive index profile shape.

Figure 3A:
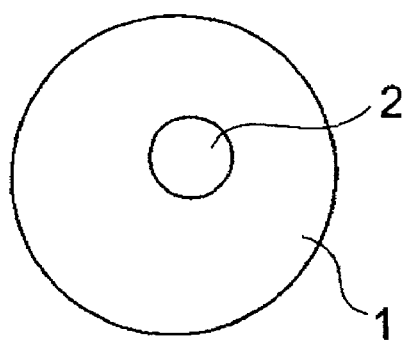
FIG. 3A shows an example of a cross-section of a crude preform perpendicular to its axis.
Figure 3B:
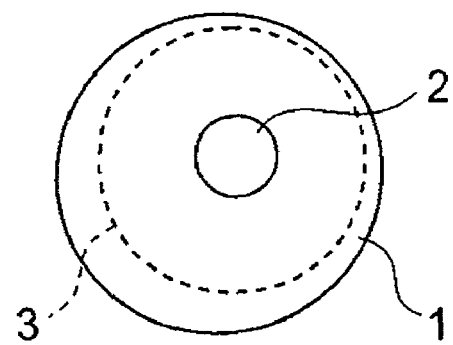
FIG. 3B shows a part which the optical fiber preform must retain and a part to be removed by grinding in the cross-section shown in FIG. 3A.

Next, with respect to the manufacturing method of the optical fiber preform of the above-mentioned embodiment, an explanation is given about the method for the demarcation of the shape that an optical fiber preform should have for achieving the production of an optical fiber having given characteristics. FIG. 3A shows an example of a cross-section perpendicular to the axis of the crude preform, and FIG. 3B shows the part that the optical fiber preform should have and the part that is to be eliminated by grinding in the cross-section shown in FIG. 3A.

An example of the refractive index profile of the cross-section of the crude preform is shown in FIG. 3A, in which the center of a low refractive index annular part 1 (a cladding region) and the center of a high refractive index circular part 2 (a core region) is deviated from each other. Such deviation occurs, for example, if a crude preform is produced by the Rod-in-collapse method and the glass pipe is not heated uniformly.

In such case, the shape of the cladding region that the optical fiber preform should have for achieving the production of an optical fiber having the given characteristics is demarcated based on the refractive index profile shape. That is, a virtual circle 3 is drawn as shown in FIG. 3B. The circle 3 is the result obtained by calculating what shape the cladding region should have relative to the core region (the circular part 2) in order to produce an optical fiber having the target characteristics.

The part inside the circle 3 shows the shape of an optical fiber preform which should be manufactured, and the part outside the circle 3 and surrounded by the outer peripheral line of the annular part 1 is the region to be removed by grinding. Such work is carried out at a plurality of positions in the longitudinal direction of the crude preform, and the part and quantity to be ground are determined for the whole crude preform. Then, in the manner described above, the crude preform is ground based on the results of such determination, and an optical fiber preform is produced.

The method for manufacturing an optical fiber preform according to the present invention is described further in detail below with reference to an example. The example described below corresponds to the first embodiment mentioned above.

EXAMPLE

As an example, an optical fiber preform for producing a dispersion compensating fiber is prepared. The target characteristics of this dispersion compensating fiber are such that the chromatic dispersion at the 1.55 μm wavelength is −125 ps/km/nm and the dispersion slope compensating ratio is 75%. Here, the dispersion slope compensating ratio is defined as (the dispersion slope/the chromatic dispersion)$_{DCF}$/(the dispersion slope/the chromatic dispersion)$_{SMF}$×100 (%). DCF means a dispersion compensating fiber, and SMF means a single mode fiber. The value of the dispersion slope of SMF used for calculation is +0.057 ps/km/nm$^2$ at the 1.55 μm wavelength, and the chromatic dispersion of SMF is +16.9 ps/km/nm at the 1.55 μm wavelength.

Figure 4:
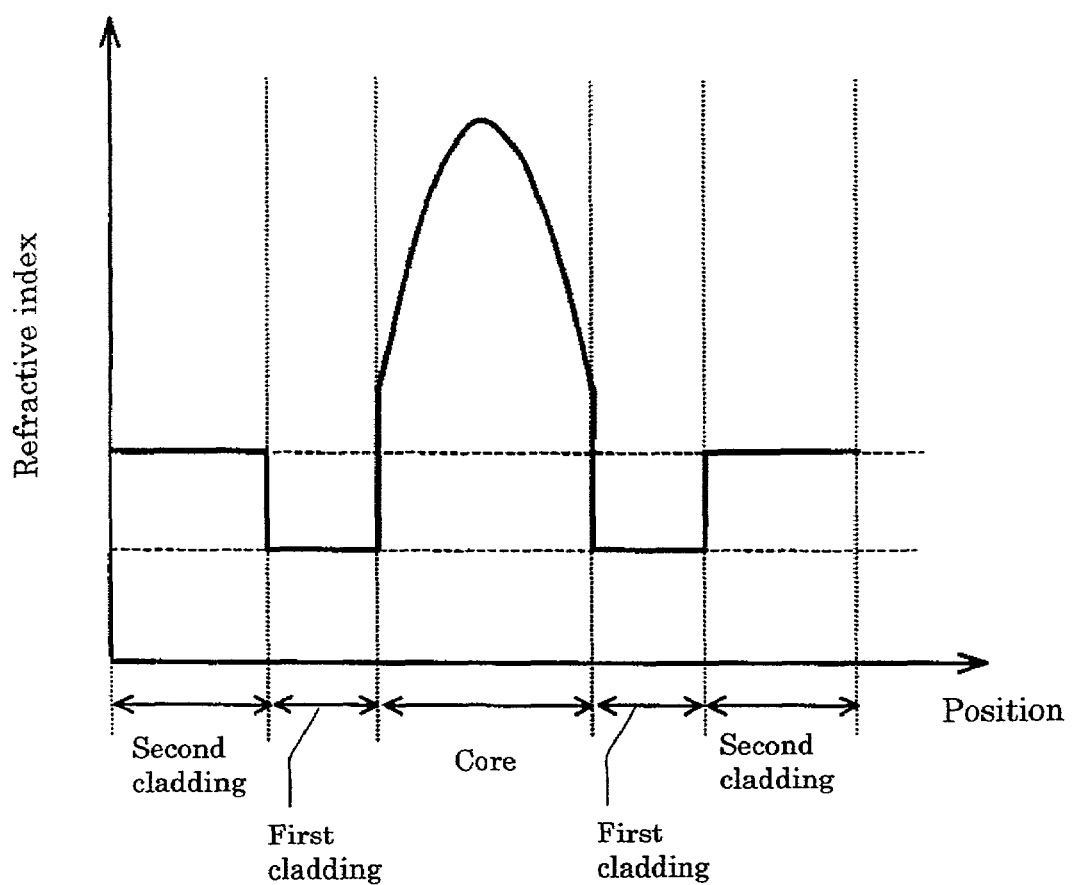
FIG. 4 is a graph showing an example of refractive indexes measured along a straight line on the cross-section perpendicular to the axis of the crude preform used in Example 1.

First, a crude preform to be used for the manufacture of the optical fiber preform is prepared. FIG. 4 is a graph showing an example of a refractive index measured along a straight line on a cross-section of the crude preform perpendicular to its axis. The crude preform has a depressed-type refractive index profile.

First, the refractive indexes were measured using a preform analyzer at the positions of 30 mm, 60 mm, 166 mm, 232 mm, 272 mm, 287 mm, and 302 mm distanced from one end of the crude preform, respectively. The core diameters and the outer diameters of the crude preform at measured positions are shown in Table I.

TABLE I

| Measured position mm | Core diameter mm | Outer diameter mm | Target diameter mm | Grind quantity mm | Preform diameter mm |
|---|---|---|---|---|---|
| 30 | 1.293 | 69.39 | 64.91 | 4.48 | 64.68 |
| 60 | 1.281 | 69.18 | 64.31 | 4.87 | 64.03 |
| 166 | 1.303 | 68.64 | 65.41 | 3.23 | 65.09 |
| 232 | 1.324 | 68.13 | 66.46 | 1.67 | 66.34 |
| 272 | 1.324 | 67.82 | 66.46 | 1.36 | 66.25 |
| 287 | 1.343 | 67.51 | 67.42 | 0.09 | 67.25 |
| 302 | 1.351 | 67.82 | 67.82 | 0.00 | 67.64 |

The target outer diameter was subsequently determined for each measured position such that the ratio (hereinafter, the "magnification") of the cladding diameter to the core diameter becomes constant for all measured position. Next, the grind quantity (=the outer diameter of the crude preform−the target outer diameter) was calculated from the target outer diameter. Moreover, the grind quantity for each intermediate position between these measured positions was obtained by interpolation of the grind quantity of the measured positions of the crude preform. Thus, an optical fiber preform was produced by grinding the crude preform after inputting the data of the obtained grind quantity into a numerically controlled lathe.

The magnification of the produced optical fiber preform was calculated by measuring the outer diameter (the cladding diameter) and the core diameter, and furthermore the magnification variation (2×(the maximum magnification−the minimum magnification)/(the maximum magnification+the minimum magnification)×100) was calculated.

As a result, the magnification variation of the optical fiber preform (after grinding) was 0.3%. The magnification variation of the crude preform (before grinding) was about 7% when calculated from the measured values of the crude preform. It is understood that the magnification variation of the optical fiber preform is remarkably reduced compared with that of the crude preform.

Figure 5:
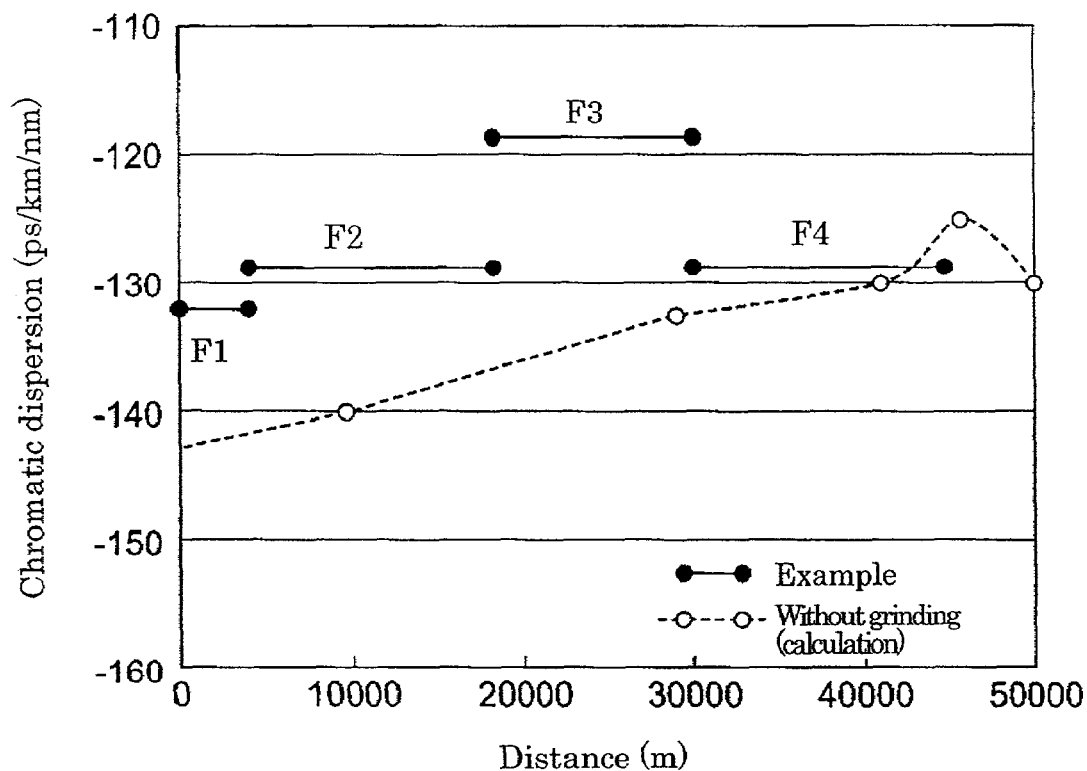
FIG. 5 is a graph showing the chromatic dispersion of the optical fiber manufactured in Example 1 at the 1.55 μm wavelength.

Subsequently, this optical fiber preform was drawn into an optical fiber of 50 km length. The optical fiber was divided into four pieces F1, F2, F3, and F4. Then, the chromatic dispersion and the dispersion slope of the optical fibers F1 through F4 were measured. FIG. 5 is a graph showing each chromatic dispersion at the 1.55 μm wavelength of the optical fibers F1 through F4. In FIG. 5, the abscissa shows a distance from one end of the undivided 50 km-length optical fiber. As can be seen from FIG. 5, the chromatic dispersions of the four optical fibers F1 through F4 were —125±6 ps/km/nm, which are the same as the target values. Also, the difference between the maximum value and the minimum is about 12 ps/km/nm.

Figure 6:
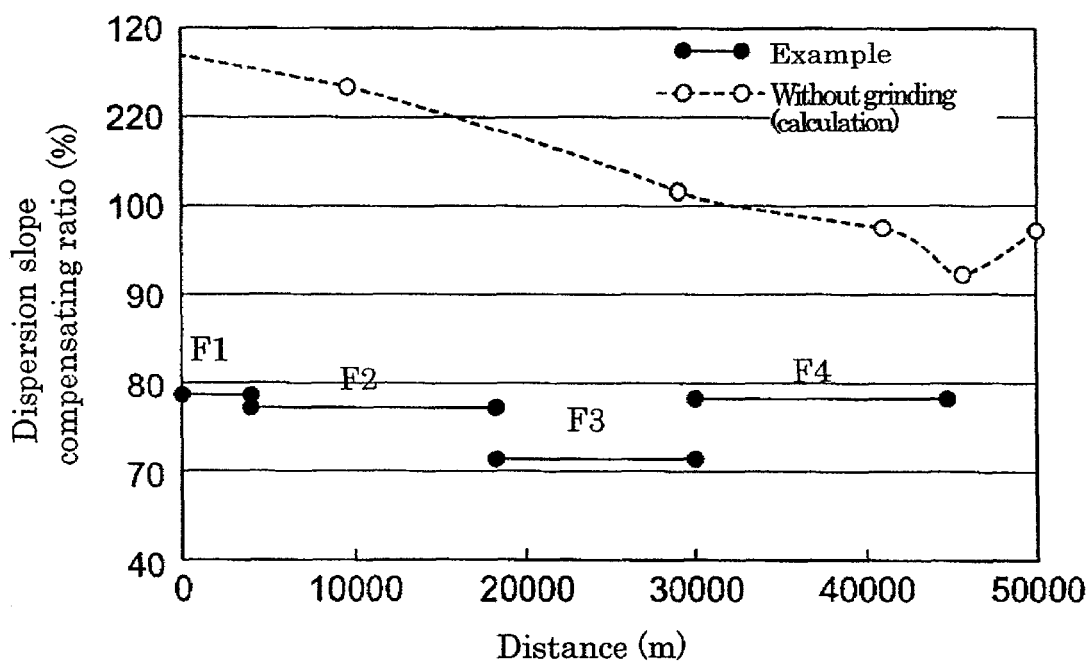
FIG. 6 is a graph showing the dispersion-slope compensating ratio of the optical fiber manufactured in Example 1 at the 1.55 μm wavelength.

FIG. 6 is a graph showing each dispersion-slope compensating ratio of the optical fibers F1 through F4. As is understood from FIG. 6, each dispersion-slope compensating ratio of the four optical fibers was within the range of about 75±5%, which was the target value. The difference between the maximum value and the minimum of the dispersion slope compensating ratio of the four optical fibers was about 10%.

For the purpose of comparison, assuming that an optical fiber was drawn from a crude preform without grinding, the chromatic dispersion and the dispersion slope compensating ratio were calculated. In this case, since the measured outer diameter of the crude preform becomes the outer diameter of the cladding region, the magnification was calculated from the outer diameter of the cladding region and the measured core diameter. Based on the magnification, the chromatic dispersion and the dispersion slope compensating ratio at each measured position were then calculated, and the moving average of these values for every 10 km length of the optical fiber was obtained.

The results are shown in FIG. 5 and FIG. 6. As shown in FIG. 5 in the case of the crude preform without grinding, the difference between the maximum and the minimum value of the chromatic dispersion is about 18 ps/km/nm at the 1.55 μm wavelength. Also, it is understood from FIG. 6 that the difference between the maximum and minimum values of the dispersion slope compensating ratio is about 24% at the 1.55 μm wavelength.

It can be seen that at the 1.55 μm wavelength, the differences between the maximum value and the minimum value with respect to the chromatic dispersion and the dispersion slope compensating ratio of the four optical fibers (actually prepared) are substantially reduced as compared with the results calculated based on the assumption of no grinding, respectively. This proves the effect of the present invention for manufacturing an optical fiber preform.

MODIFIED EXAMPLE

The embodiments of the method of manufacturing an optical fiber preform according to the present invention, which are described above with reference to the example, can be modified in various ways. Particularly, the shape that an optical fiber preform should have for producing an optical fiber having given characteristics may be demarcated in a suitable manner according to the shape of a prepared crude preform and the characteristics of the optical fiber to be produced: for example, such demarcation may be done as follows.

Figure 7A:
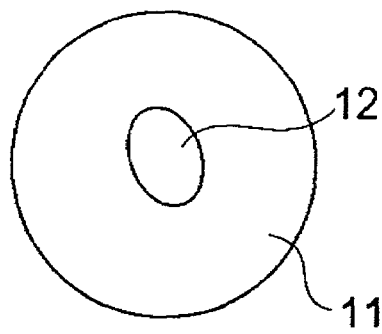
FIG. 7A shows an example of a cross-section of a crude preform perpendicular to its axis.
Figure 7B:
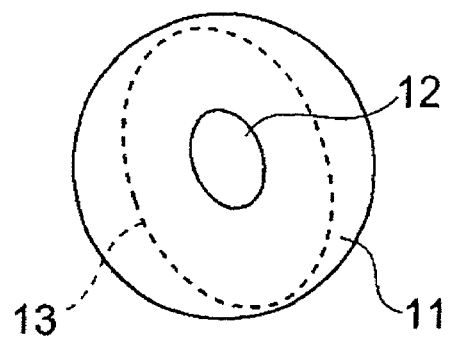
FIG. 7B shows a part which the optical fiber preform must retain and a part to be removed by grinding in the cross-section shown in FIG. 7A.

When the refractive index profile of the cross-section of a crude preform is measured, if the center of the annular part 11 (the cladding region) having a low refractive index and the center of the elliptical part 12 (the core region) having a high refractive index are found to be deviated from each other as shown in FIG. 7A, in such case, a virtual ellipse 13 can be drawn such that its center agrees with that of the elliptical part 12 and its shape is analogous to the elliptical part 12 as shown in FIG. 7B.

Here, the ratio of analogousness of the ellipse 13 to the elliptical part 12 is determined by calculating the ratio that enables an optical fiber, which is to be produced from the preform, to have the target characteristics. The ellipse 13 determined in such manner shows the shape of the optical fiber preform to be manufactured. The part to be eliminated by grinding is the region which is outside the ellipse 13 and which is demarcated by the outer peripheral line of the annular part 11. Such work is executed at a plurality of positions in the longitudinal direction of the crude preform, and the grind part and quantity are determined for the whole crude preform. Then, the crude preform is ground based on the results of the above determination to produce an optical fiber preform.

If such optical fiber preform is drawn into an optical fiber, the ellipse 13 will become close to a true circle due to the action of surface tension, and the elliptical part 12 will also become close to a true circle accordingly. Thus, the core region and the cladding region of the optical fiber will have low core eccentricity and high circularity. That is, according to the method of the present invention for manufacturing an optical fiber preform, even in the case where the core region of a crude preform has a non-circular cross-section due to some cause, it is possible to produce an optical fiber preform suitable for manufacturing an optical fiber having the target characteristics.

Figure 8:
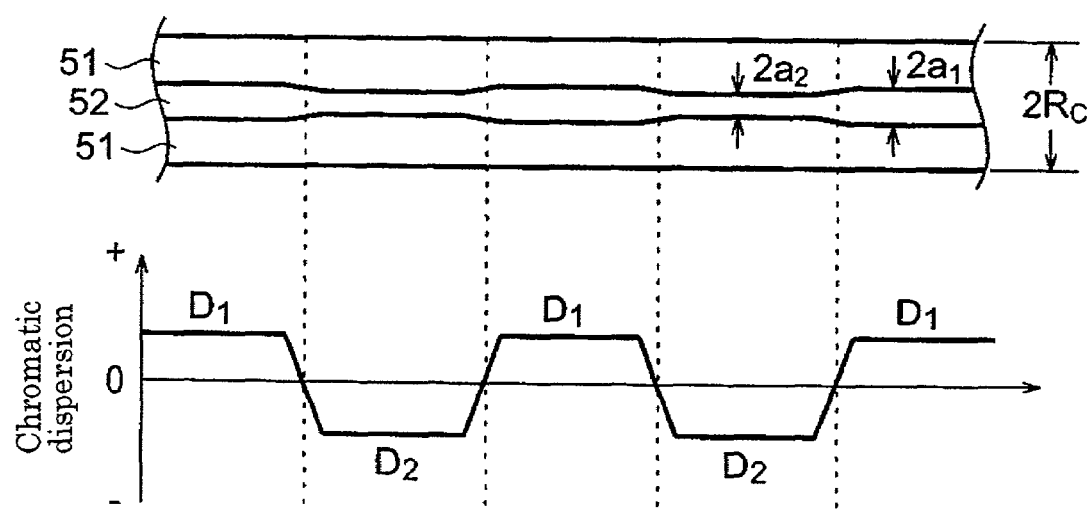
FIG. 8 is a schematic diagram showing an example of the composition of a dispersion managed fiber.

Also, the method of the present invention for manufacturing an optical fiber preform can be applied to the preparation of an optical fiber preform for a dispersion managed fiber in which a section where the chromatic dispersion at the wavelength of signal light is positive and a section where the chromatic dispersion at the wavelength of signal light is negative are alternately provided. For example, in the case of manufacturing a dispersion managed fiber with target characteristics whose cladding region 51 has a constant outer diameter of 2Rc and whose core region 52 is provided with alternately a positive dispersion section $D_1$ having a diameter of $2a_1$ and a negative dispersion section $D_2$ having a diameter $2a_2$ as shown in FIG. 8, such dispersion managed fiber can be produced by drawing an optical fiber preform, which has a constant core diameter and which is provided with sections having two alternately different outer diameters, to a constant outer diameter of 2Rc. The shape of the cladding region of such optical fiber preform is demarcated as follows.

First, the refractive indexes of the cross-section of a crude preform are measured at a plurality of positions in the longitudinal direction of the crude preform. Here, the positions are the positions that correspond to a positive dispersion section $D_1$ and a negative dispersion section $D_2$, respectively, of the dispersion managed fiber produced as a final product.

Figure 9A:
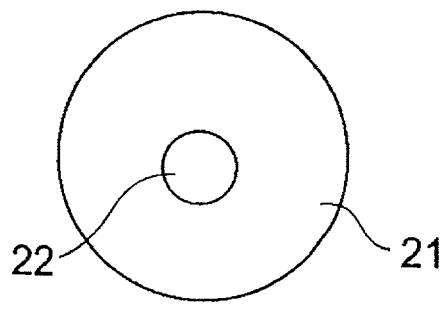
FIGS. 9A through 9D illustrate the demarcation of the suitable shapes of a cladding that an optical fiber preform must have for producing a dispersion managed fiber.
Figure 9B:
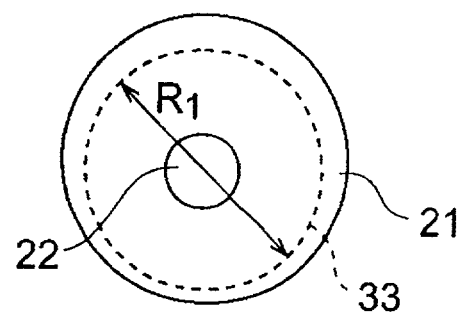

Now, in such case that the refractive index profile at the position that becomes a positive dispersion section $D_1$ has a shape in which the center of an annular part 21 (a cladding region) of low refractive index and the center of a circular part 22 (a core region) of high refractive index are deviated from each other as shown in FIG. 9A, a virtual circle 33 is drawn such that its center coincides with the center of the circular part 22 and its diameter is $2R_1$ (FIG. 9B). Here, the diameter $2R_1$ is the value that is determined so as to make the core diameter of the positive dispersion section $D_1$ of an optical fiber to become $2a_1$ when it is produced by drawing the optical fiber preform such that the optical fiber has an outer diameter of 2Rc.

Figure 9C:
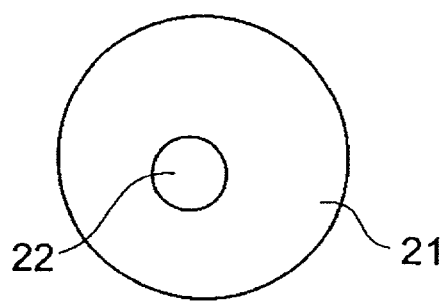
Figure 9D:
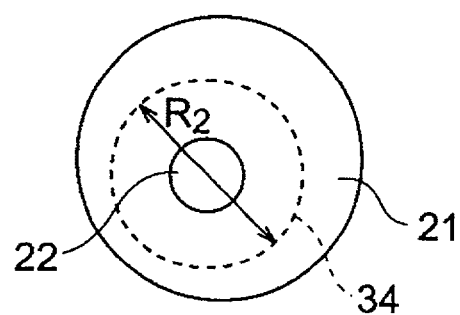

Also, in such case that the refractive index profile at the position that becomes a negative dispersion section $D_2$ has a shape in which the center of the annular part 21 (the cladding region) of low refractive index and the center of the circular part 22 (the core region) of high refractive index are deviated from each other as shown in FIG. 9C, a virtual circle 34 is drawn such that its center agrees to the center of the circular part 22 and its diameter is $2R_2$ (FIG. 9D). Here, the diameter $2R_2$ is the value that is determined so as to make the core diameter of the negative dispersion section $D_2$ of an optical fiber to become $2a_2$ if the optical fiber preform is drawn into the optical fiber having an outer diameter of 2Rc.

The parts which are surrounded by the outer peripheral part of the annular part 21 and the circles 33 and 34 determined as described above are the parts to be eliminated by grinding, and these parts are ground by a numerically controlled lathe, or the like, whereby an optical fiber preform is manufactured. In the above explanation, an optical fiber preform in which sections having two different outer diameters are alternately formed by grinding is drawn as it is. However, the optical fiber preform may be subjected to a preliminary drawing once so as to have a uniform outer diameter, and then may be drawn into a fiber. At the time of such preliminary drawing, sections having different core diameters are alternately formed.

According to the method of the present invention for manufacturing an optical fiber preform, the shapes of a crude preform that become a positive dispersion section and a negative dispersion section, respectively, are demarcated based on the refractive index profiles measured at a plurality of positions along the longitudinal direction of the crude preform. Subsequently, grinding is done based on the results of such demarcation, and thereby an optical fiber preform is manufactured. Therefore, the dispersion managed fiber manufactured from the preform will have the target characteristics.

Also, the method of manufacturing an optical fiber preform according to the present invention can be suitably applied to a crude preform in which the diameter of the core region is not constant in the longitudinal direction, for example. That is, according to the method of the present invention for manufacturing an optical fiber preform, even in the case of using a crude preform in which the diameter of the core region changes longitudinally, it is possible to produce an optical fiber preform in which the ratio of the outer diameter of the cladding region to the diameter of the core region is constant. Then, if the optical fiber preform is drawn by appropriately adjusting the drawing speed and heating temperature, etc., it is possible to thereby produce an optical fiber having a constant outer diameter in which the ratio of the outer diameter of the cladding region to the diameter of the core region is constant.

In the past it has often been the case that a crude preform is discarded if the diameter of its core region is not longitudinally constant. However, according to the method of the present invention, such crude preform can be used for making an optical fiber preform that can produce an optical fiber having the intended characteristics. Also, in the past, it has been necessary for a crude preform to have a high-precision shape to produce an optical fiber having a narrow scope of allowance in the profile shape parameter. Such crude preform has been high-cost. However, in the method of the present invention for manufacturing an optical fiber preform, even a crude preform that is not high in the precision of shape can be processed into an optical fiber preform from which an optical fiber having a narrow-scope profile shape parameter can be manufactured. That is, the method of the present invention for manufacturing an optical fiber preform is also advantageous in terms of cost reduction for manufacturing an optical fiber.

In the above-described embodiment, the crude preform was prepared by the Rod-in-collapse method. However, a crude preform may be prepared by the OVD method, the VAD method, the MCVD method, or the plasma method, etc. Also, an optical fiber preform that is manufactured by the manufacturing method of the present invention may be a preform for producing a dispersion shifted fiber, a dispersion compensating fiber, a dispersion flatted fiber, or an amplifying fiber, etc.

When grinding the outer peripheral part of a crude preform in the above-described embodiment, a numerically controlled lathe is used. However, it is not a limitation. Any method suitable for achieving the shape that is demarcated based on the results of refractive index measurement may be appropriately chosen. For example, there are machine tools such as a rotary grinder or a grinder with abrasive grains, a grinding method using oxyhydrogen flame or plasma flame, an etching method, and so on. Also, it is preferable that, even if a crude preform has been ground by these methods, the outer peripheral part of the crude preform is subjected to etching with a solution that includes HF after such grinding.

What is claimed is:

1. A method of manufacturing an optical fiber preform, the method comprising sequentially:

preparing a crude preform for manufacturing an optical fiber preform;

measuring the refractive indexes along a straight line in the cross-section which is perpendicular to the axis of the crude preform at a plurality of positions in the longitudinal direction of the crude preform;

estimating characteristics of an optical fiber to be produced from the preform based on the measured refractive indexes;

comparing the estimated characteristics to target characteristics of the optical fiber;

demarcating the outer diameters of the crude preform at intermediate positions between the measured portions to eliminate any differences between the target characteristics and the estimated characteristics; and selectively grinding the crude preform based on the results of demarcating the outer diameters.

2. A method of manufacturing an optical fiber preform according to claim 1, comprising demarcating the outer diameter shape of the crude preform based on a fitting obtained using the results of measuring the refractive indexes and a given function.

3. A method of manufacturing an optical fiber preform according to claim 1, further comprising etching the outer peripheral part of the crude preform in a solution that includes at least hydrofluoric acid after grinding.

4. A method of manufacturing an optical fiber preform according to claim 1, comprising forming a cladding region around the outer peripheral part of the crude preform, before measuring the refractive indexes, demarcating the outer diameter, and grinding to produce the optical fiber perform.

5. A method of manufacturing an optical fiber perform according to claim 1, wherein the estimating characteristics include chromatic dispersion characteristics.

* * * * *